United States Patent

Grieb et al.

[11] Patent Number: 5,272,870
[45] Date of Patent: Dec. 28, 1993

[54] COOLING ARRANGEMENT FOR JET ENGINES

[75] Inventors: Hubert Grieb, Germering; Gerhard Pellischek, Wolfratshausen, both of Fed. Rep. of Germany

[73] Assignee: MTU Motoren- und Turbinen-Union Munchen GmbH, Fed. Rep. of Germany

[21] Appl. No.: 941,886

[22] Filed: Sep. 8, 1992

[30] Foreign Application Priority Data

Sep. 25, 1991 [DE] Fed. Rep. of Germany ....... 4131913

[51] Int. Cl.$^5$ .............................................. F02K 11/00
[52] U.S. Cl. ........................................ 60/267; 60/728; 60/736
[58] Field of Search ................ 60/266, 267, 728, 734, 60/736

[56] References Cited

U.S. PATENT DOCUMENTS

| | | | |
|---|---|---|---|
| 2,851,863 | 9/1958 | Theed | 60/736 |
| 3,733,826 | 5/1973 | Wolf et al. | 60/263 |
| 3,740,949 | 6/1973 | Wolf et al. | 60/267 |
| 4,041,697 | 8/1977 | Coffinberry et al. | 60/736 |
| 4,696,156 | 9/1987 | Burr et al. | 60/736 |
| 5,088,280 | 2/1992 | Scott-Scott et al. | 60/267 |
| 5,152,146 | 10/1992 | Butler | 60/736 |

FOREIGN PATENT DOCUMENTS

| | | | |
|---|---|---|---|
| 3635548 | 3/1988 | Fed. Rep. of Germany. | |
| 3942022 | 6/1991 | Fed. Rep. of Germany. | |
| 0763449 | 12/1956 | United Kingdom | 60/736 |
| 0899312 | 6/1962 | United Kingdom | 60/728 X |

*Primary Examiner*—Richard A. Bertsch
*Assistant Examiner*—Michael I. Kocharov
*Attorney, Agent, or Firm*—Evenson, McKeown, Edwards & Lenahan

[57] ABSTRACT

A cooling arrangement for the cooling air of hypersonic jet engines comprises a heat exchanger in which the temperature of the cooling air is reduced by means of the fuel to be burnt in the engine. In order to keep the operating temperatures of the heat exchanger within controllable limits, a partial flow of the cooling air is branched off downstream of the heat exchanger and is admixed to the cooling air upstream of the heat exchanger for reducing the temperature.

6 Claims, 5 Drawing Sheets

FIG. 3
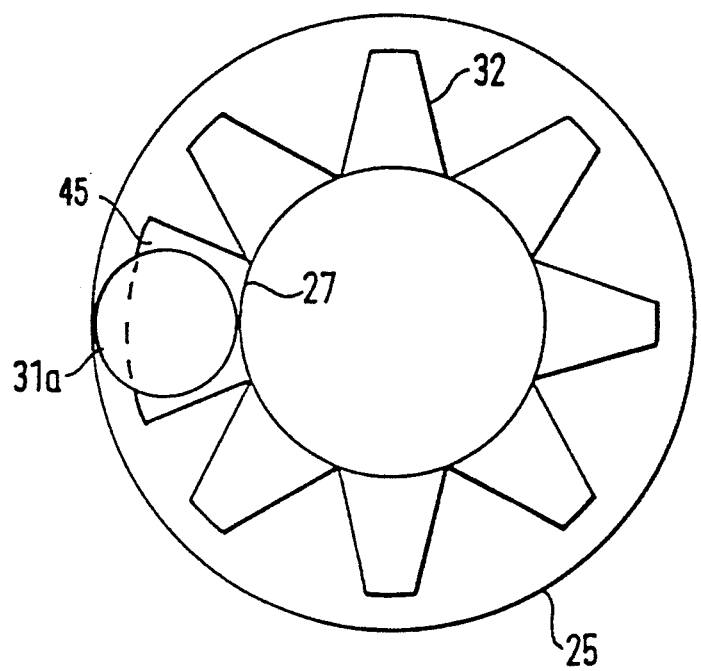
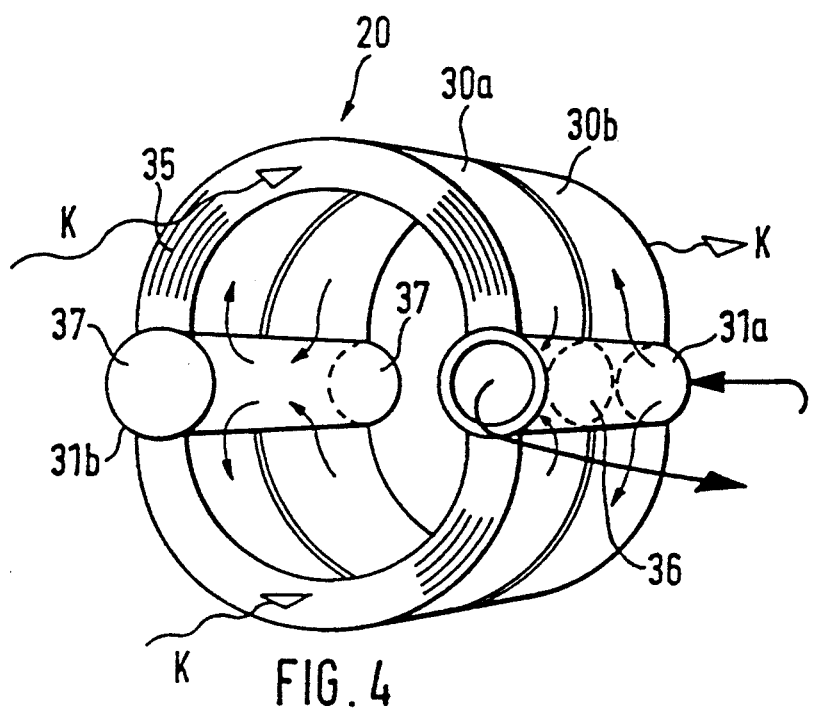
FIG. 4

COOLING ARRANGEMENT FOR JET ENGINES

BACKGROUND AND SUMMARY OF THE INVENTION

The present invention relates to a cooling arrangement for the cooling air of a jet engine which is operated by means of cryogenically stored fuel, particularly hydrogen. The fuel, after the heat absorption, is fed to the engine in a heat exchanger arranged in line with the fuel feeding pipe. The cooling air which is removed from an air inlet of the engine by way of an air feeding pipe, after the heat loss in the heat exchanger, is fed to the engine for cooling. This type of an arrangement is known from the German Patent Document DE 39 42 022 A.

Because of the high Mach number, the temperatures occurring in a jet engine for high-speed aircraft are extremely high. This is particularly true for hypersonic aircraft. As a result, there is a high amount of heat that must be carried away in order to maintain the material temperature of the components in the hot area of the engine within the permissible technical limits. There is the additional problem in this case that the air temperatures in the air inlet of a hypersonic engine in the case of Mach numbers in the range of from 5 to 7, reach 1,500 K to 2,300 K. A cooling of the hot engine components, for example, in the area of the combustion chamber, the turbine and parts connected behind them, such as afterburner elements, by such heated air is particularly difficult. The heated air is therefore fed to a cooling arrangement where it is cooled intermediately in a heat exchanger while the cooling capacity of the fuel is used which is carried along in a liquid state but is burnt in the gaseous state. Hydrogen is particularly suitable for this purpose. The permissible heating of the hydrogen is the result of the fact that the exchange elements of the heat exchanger which, at the same time, are used to separate the hydrogen from the air, in the case of a metallic construction, must be held below maximal temperatures of from 1,000 K to 1,100 K. Locally, exchange elements are stressed by temperatures in the range of the air inlet temperature.

Because of the low inlet temperature of the fuel, there is the danger, however, that the temperature of the cooled air may locally fall below 273 K so that the water contained in the air will precipitate on the walls of the heat exchanger or on the exchange matrix as ice. This clogs the heat exchanger on the air side. This danger becomes acute specifically in the case of lower Mach numbers, thus also in the case of supersonic and subsonic aircraft with cryogenically stored fuel since here the heating of the air is lower. These problems apply particularly to the arrangement that has become known on the basis of the German Patent Document DE 39 42 022 A1. This danger also exists for the heat exchanger of a jet engine according to the U.S. Patent Document 3,733,826 which is arranged for the cooling of the combustion air between the air inlet and the compressor or for the heating of the fuel.

There is therefore needed a cooling arrangement of the above-mentioned type which avoids the mentioned problems and permits a high degree of exchange while the constructional expenditures are as low as possible. In addition, a compact and operationally reliable heat exchanger is to be provided which can be easily integrated into a cooling arrangement of this type.

According to the invention, these needs are met by a cooling arrangement for the cooling air of a jet engine which is operated by means of cryogenically stored fuel, particularly hydrogen. The fuel, after the heat absorption, is fed to the engine in a heat exchanger arranged in line with the fuel feeding pipe. The cooling air which is removed from an air inlet of the engine by way of an air feeding pipe, after the heat loss in the heat exchanger, is fed to the engine for the cooling. A partial flow of the evaporated fuel flowing out of the heat exchanger, delivered by a controllable recirculating blower, by way of a fuel mixing device, is fed to the fuel before it flows through the matrix of the heat exchanger. A cooling air compressor can be arranged in the cooling air pipe between the heat exchanger and the engine. A partial flow of the gas downstream of the matrix is delivered by means of a controllable gas blower arranged in the hollow cylinder.

The arrangement according to the invention has the advantage that, according to the required air outlet temperature, the fuel temperature at the inlet as well as at the outlet of the heat exchanger can be adjusted by a corresponding control of a recirculating blower. Icing of the heat exchanger can therefore be avoided largely independently of the momentary fuel consumption of the engine which significantly influences the cooling performance of the heat exchanger. By the recirculating of a partial flow of the fuel, the temperature differences are decreased mainly in the area of the exchange matrix and the stress to the material is therefore reduced. In the case of the countercurrent heat exchanger, this is particularly true in the case of the air outlet area of the matrix. This results in an operational safety that is absolutely necessary for aviation, particularly in view of the use of hydrogen as the working medium of the heat exchanger. An engine-caused limiting of the flight envelope can be reduced in that the feeding of the partial flow T takes place while the flight condition values are taken into account.

Another measure for avoiding extreme stress to material because of temperature contrasts, particularly in the area of the air inlet side of the matrix, consists of the construction of the arrangement wherein a partial flow of the cooling air is branched off downstream of the matrix and is fed to the cooling air upstream of the matrix by way of a return flow duct. In addition, the required operating values, when a controllable blower arranged in the return flow duct is used, can be controlled largely variably in cooperation with the recirculating blower.

Because of the fact that, in the area of the fuel outlet of the matrix, fuel already heated flows through the matrix, this matrix is subjected to higher temperature-caused stress. In order to be able to avoid undesirably high temperatures, it is provided to feed to the cooling air in the area of the fuel outlet of the matrix, at least a fraction of the partial flow L in a concentrated manner.

In order to be able to also supply turbine stages with cooling air, it is necessary to compress the cooling air to the pressure level inside the turbines. For this reason, the arrangement of a cooling air compressor downstream of the heat exchanger is suggested which results in a lower required compressor power than in the case of the compression of uncooled air.

A space-saving construction of a heat exchanger is obtained by integrating a drum-shaped matrix into the cylindrical pressure housing. The cylindrical construction of the heat exchanger ensures a reliable pressure tightness of the enclosing pressure housing and therefore meets the high safety requirements when used in an aircraft.

In order to avoid thermal problems on the heat exchanger also in the case of extremely high gas entry temperatures, which occur particularly in hypersonic flight, in a consequent space-saving construction, a partial flow L, by way of the return flow duct in the interior of the hollow cylinder, can be admixed to the uncooled gas flow upstream of the matrix. By means of this construction, it is possible to lower the gas entry temperature in front of the matrix to such an extent that the behavior of the material can be controlled at the operating temperature. Furthermore, a homogeneous mixing of the gas flow with the partial flow can be achieved. This is important for the operating behavior.

In order to avoid local excess temperatures on the matrix, it is recommended in this case to arrange the gas mixing device or at least an additional gas mixing device in the area of the cooling medium outlet of the matrix for the concentrated admixing in this area.

In an expedient combination of the invention with the characteristics that the gas mixing device or an additional gas mixing device is arranged in the area of the cooling medium outlet of the matrix for the concentrated admixing of gases of the partial flow. Even if the cooling requirement fluctuates considerably together with the flight Mach number, the heat exchanger components may be kept in a narrow temperature range which benefits the stability as well as the operational reliability.

Additional advantageous constructions with respect to the heat exchanger with a drum-shaped matrix are also provided.

For achieving a high degree of exchange, while the utilization of space of a heat exchanger with a cylindrical pressure housing is acceptable, a construction having the characteristics that at least two drum-shaped matrices are arranged behind one another in the ring duct and are connected in series by way of central pipes, forming a cross countercurrent matrix. This construction was found to be advantageous. Preferably, it is also provided to equip the matrix with hairpin-shaped special section tube bows which project into the flow direction and which are connected to two central pipes which supply and remove cooling medium. Expansions of the special section tube bows can therefore develop in the longitudinal direction of the flow without any tension.

Additional advantageous developments of the heat exchanger with respect to low pressure losses in the gas and an optimal degree of exchange are also provided.

Other objects, advantages and novel features of the present invention will become apparent from the following detailed description of the invention when considered in conjunction with the accompanying drawings.

BRIEF DESCRIPTION OF THE DRAWINGS

FIG. 3 is a cross-sectional view of the heat exchanger according to FIG. 2.

FIG. 4 is a perspective representation of a matrix bundle consisting of two drum matrices.

DETAILED DESCRIPTION OF THE DRAWINGS

Figure 1:
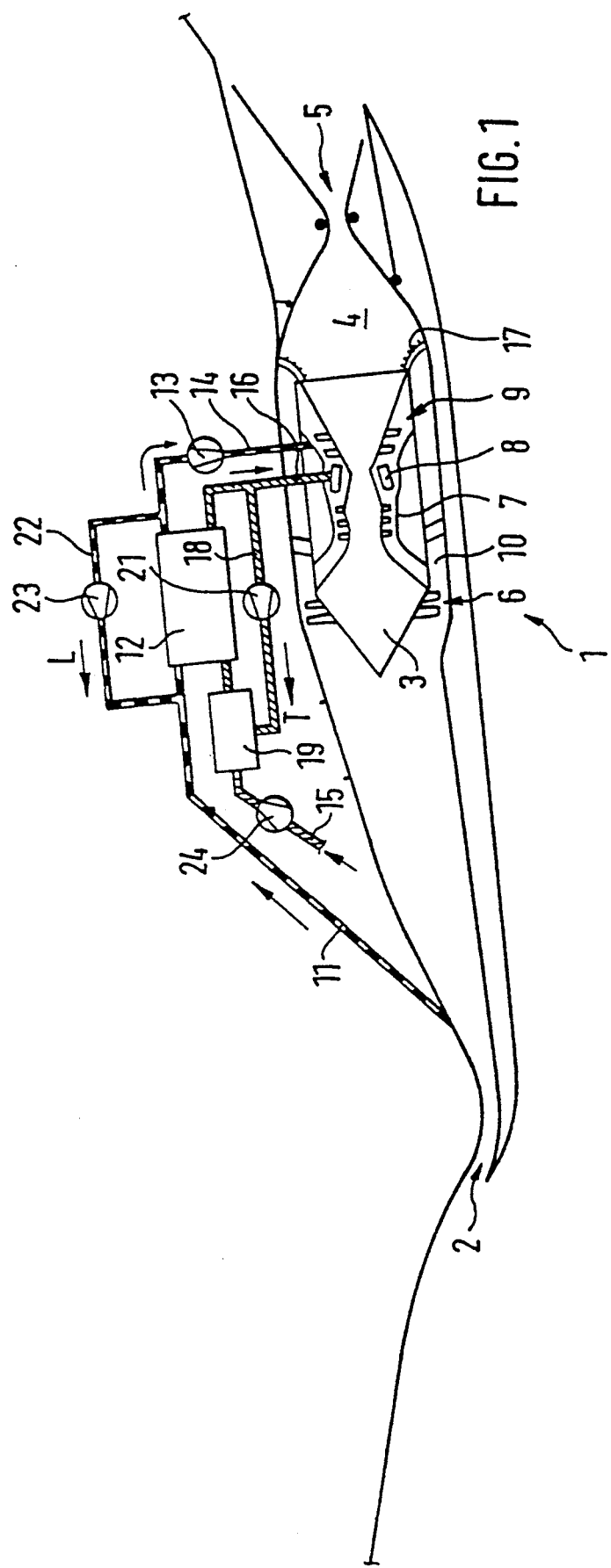
FIG. 1 is a longitudinal sectional view of a hypersonic jet engine with a schematic representation of the cooling arrangement.

FIG. 1 is a schematic longitudinal sectional view of a jet engine 1 for hypersonic operation which essentially comprises an air inlet 2, a fan engine 3, an afterburner 4 and a preferably adjustable nozzle 5. In the shown construction, the fan engine 3 is designed as a turbofan engine; that is, it comprises a two-stage fan 6 and a high-pressure compressor 7 for the core air flow. Furthermore, a combustion chamber 8 and a high-pressure and low-pressure turbine 9 are assigned to the fan engine 3.

When the flight Mach numbers are low, the jet engine 1 operates like a conventional bypass engine with a bypass duct 10. Arrangements are provided, which are not shown in detail, wherein when the flight Mach numbers are higher, a closing of the core engine 3 is permitted and an operating of the aircraft engine 1 as a ramjet engine, in which case only the afterburner 4 is switched on.

The arrangement according to the invention comprises an air guiding device 11 which communicates with the air inlet 2 and which is connected with a heat exchanger 12. The air-side outlet of the heat exchanger 12 is connected with a cooling air compressor 13 which, by way of a cooling air duct 14, is coupled with the fan engine or with the component to be cooled. This is, in particular, the turbine 9 but also other components, such as the nozzle, possibly the fan 6 or the wall of the bypass duct 10 or of the fan engine 3.

The heat which is discharged when the air is cooled is absorbed in the heat exchanger 12 by the fuel which is carried along in liquid form and which flows through the heat exchanger 12 while evaporating. For this purpose, at least one fuel feeding pipe 15 with a fuel pump 24 for liquid or gaseous fuel and a flow-off pipe 16 for evaporated fuel is connected to the heat exchanger 12. The flow-off pipe 16 is connected with the injection device 17 of the afterburner 4 and also supplies the combustion chamber 8 with fuel.

For recirculating a partial flow T of the fuel flowing out of the heat exchanger 12, a recirculating pipe 18 is connected with the flow-off pipe 16 and with a fuel mixing device 19. The fuel mixing device 19 is arranged upstream of the heat exchanger 12 and mixes fuel coming from the fuel feeding pipe 15 with preheated evaporated fuel. According to the danger of an icing of the heat exchanger 12 or its matrix 20 (FIG. 2) and the condition values for the fuel and the cooling air desired for the operation of the jet engine 1, by way of a controlling device, which is not shown in detail, a recirculating blower 21 is controlled which is arranged in the recirculating pipe 18 and delivers the required partial flow T.

In the case of extremely high air inlet temperatures which occur in hypersonic flight, in order not to cause excessive temperatures and temperature gradients at the heat exchanger in the air inlet area, and additionally, for the recirculating of the fuel, a partial flow L of the cooled cooling air, by way of a return flow duct 22, which is connected with the cooling air duct 14 downstream from the heat exchanger 12 and with the air feeding pipe 11 upstream of the heat exchanger 12, is admixed to the hot cooling air upstream of the matrix 20 of the heat exchanger 12. In the case of a corresponding control of the gas blower 23 arranged in the recirculating duct 22, in cooperation with the control device, the material temperatures of the heat exchanger 12 can be reduced to a technically controllable level. For the adjustment of the cooling air temperature required for the operation of the jet engine 1, the recirculating blower 21 and the gas blower 23 are controlled jointly by the control device as a function of the inflow values in the feeding devices and feeding pipes 11 and 15.

Figure 2:
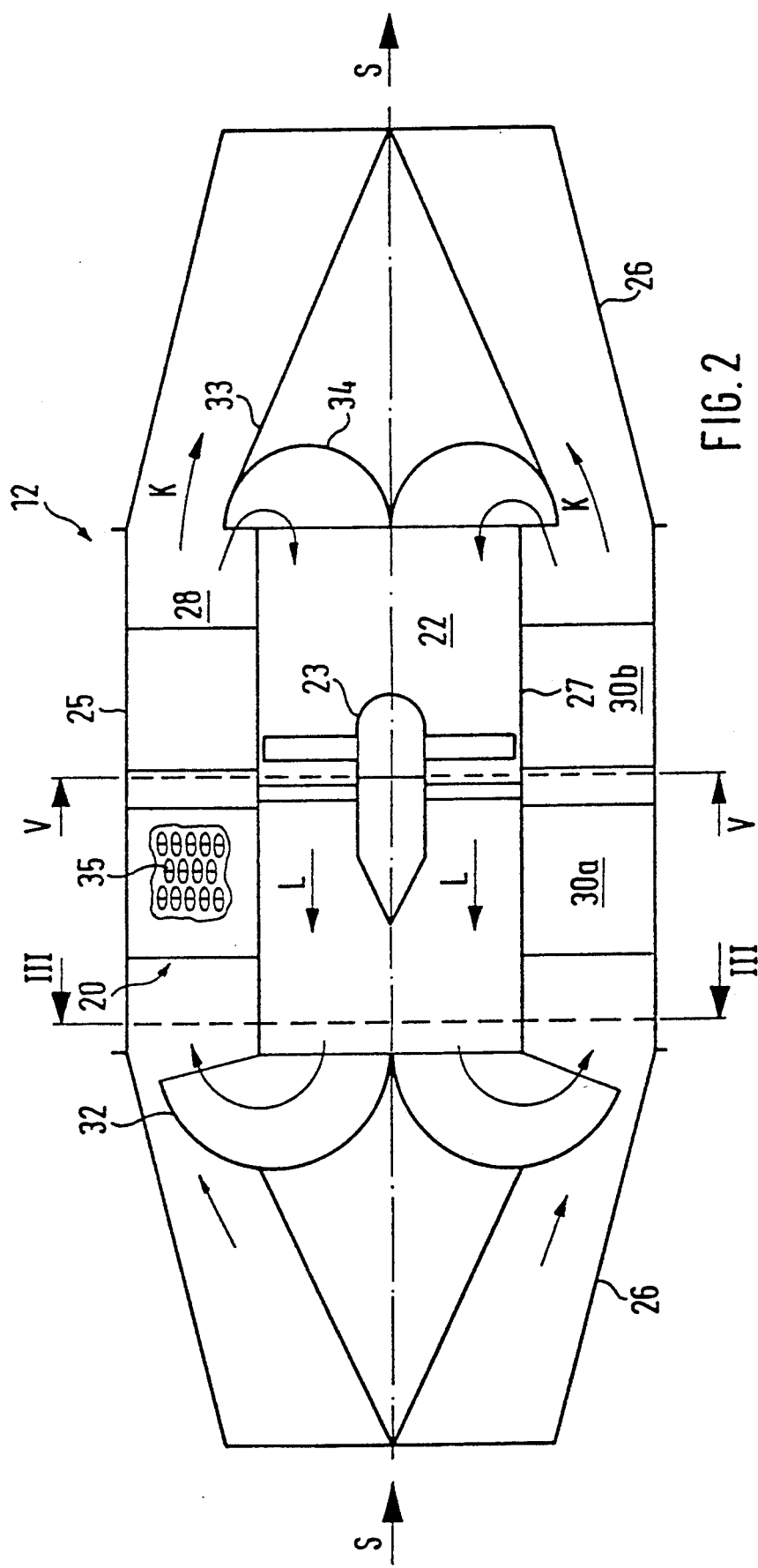
FIG. 2 is a longitudinal sectional view of a heat exchanger with a drum-shaped cross/countercurrent matrix.

FIG. 2 is a longitudinal sectional view of a heat exchanger 12 with an integrated recirculating duct 22 for the recirculating of the air. Cooling air K flows axially through the cylindrical pressure housing 25 of the heat exchanger 12 with transition cones 26 flanged to both ends. The partial flow L flows through a separate cylindrical interior space against the main flow direction S. For this purpose, the interior of the heat exchanger 12 is divided by means of a hollow cylinder 27, which is arranged concentrically with respect to the pressure housing 25, into two areas—the ring duct 28 radially outside the hollow cylinder 27 and the return flow duct 22 in the interior of the hollow cylinder 27. This hollow cylinder 27 ends on its end, which is upstream with respect to the main flow direction S, with a fan-shaped gas mixing device 32 (see FIG. 3) and mixes the partial flow L with the uncooled cooling air of the ring duct 28 and precools it. In the area of the fuel outlet, this is the mouth area B (FIG. 5) of the special section tubes 35 into the central pipe 31a, an enlarged fan 45 provides an increased air supply from the partial flow L in order to avoid local excess temperatures. The downstream end of the hollow cylinder 27 forms a cone 33 which projects into the ring duct 28 and has a deflecting surface 34 which branches the partial flow L from the ring duct 28 into the return flow duct 22. For the volume control of the partial flow L, a gas blower 23 is arranged in the return flow duct 22.

Figure 5:
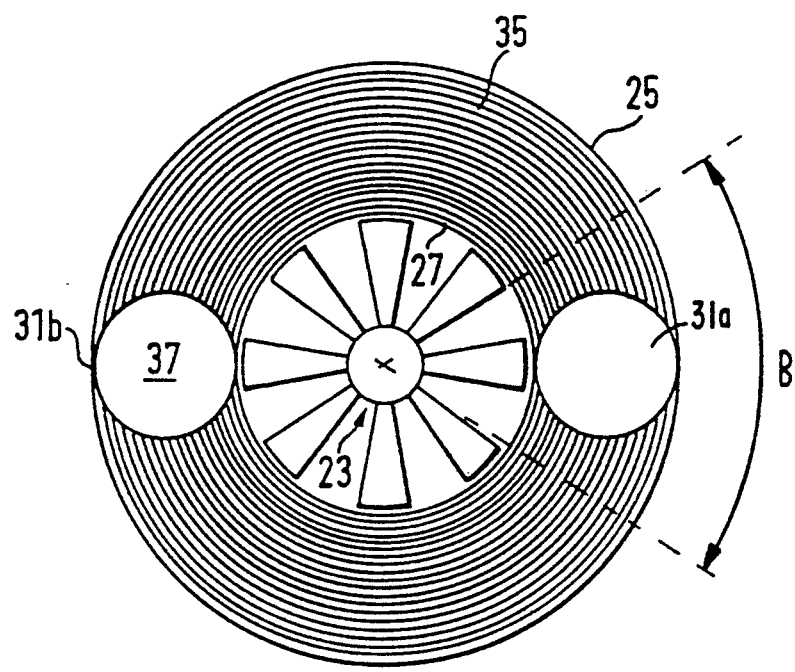
FIG. 5 is a cross-sectional view of the matrix of the heat exchanger according to FIG. 2.

The matrix 20, which is positioned in the ring duct 28 and comprises the hollow cylinder 27—as illustrated in FIGS. 4 and 5—is composed of two individual drum matrices 30 forming a cross/countercurrent matrix. For this purpose, the two drum matrices 30a and 30b are coupled by way of two central pipes 31a and 31b which are situated in parallel with respect to the longitudinal axis of the heat exchanger and diametrically opposite one another. The diameter of the central pipes 31a and 31b corresponds to the height of the ring duct 28.

The fuel flows through the matrix 20 in the manner of a cross/countercurrent as follows: From the connecting point, which is not shown here, between the first central pipe 31a and the fuel feeding pipe 15, the fuel enters into the central pipe 31a where, by way of the openings in the central pipe 31a, it flows through the circular-arc-shaped special section tubes 35 of the second drum matrix 30b to the second central pipe 31b. In the second central pipe 31b, the fuel is guided through openings into the special section tubes 35 of the first drum matrix 30a in order to finally flow off by way of the first central pipe 31a into the discharge pipe 16 (see FIG. 1). For the separation of the two outflowing and inflowing fuel currents in the first central pipe 31a and of the two drum matrices 30a and 30b, a partition 36 is inserted in the first central pipe 31a. The two ends of the second central pipe 31b are closed off by means of two coverplates 37. When the fuel flows through the special section tubes 35, it absorbs the heat of the air flowing around the special section tubes.

Figure 6:
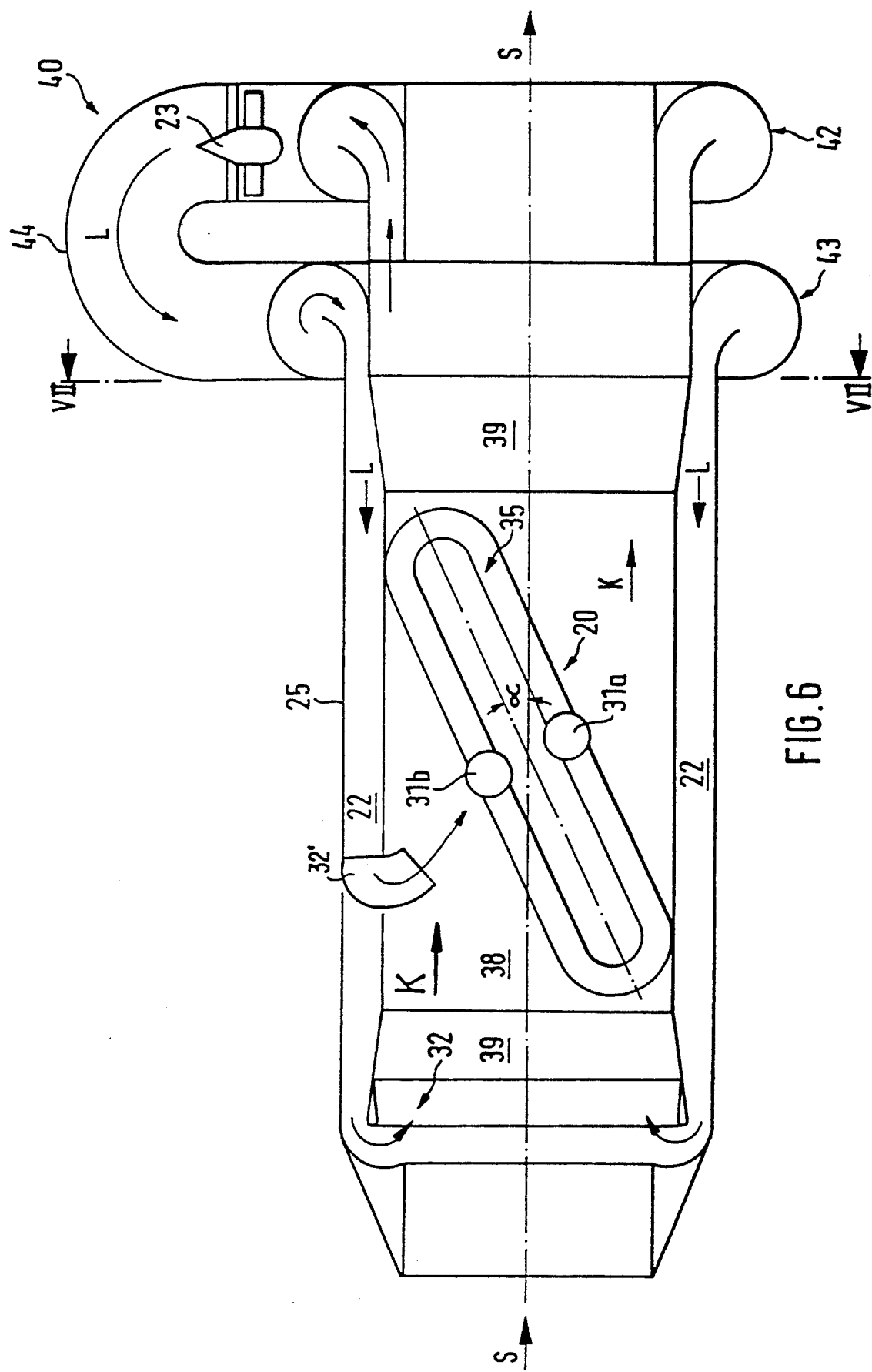
FIG. 6 is a longitudinal sectional view of a heat exchanger with a bow-shaped cross/countercurrent matrix.

Another alternative construction of a heat exchanger 12 with an integrated return flow duct 22 is illustrated in FIG. 6. In the case of this construction, the heat exchanger 12, through which an axial flow flows, comprises a cylindrical pressure housing 25, the pressure housing 25 including a square flow duct 38 in which a matrix 20 is arranged which has special section tubes 35 bent in a U-shape, as described in the German Patent Document DE 36 35 548 A1. In view of the decelerating of the arriving air flow to the speed permissible in the case of the flow through the matrix 20, the matrix 20 is tilted at an angle $\alpha$ with respect to the longitudinal axis of the heat exchanger. At both ends of the rectangular flow duct 38, the latter is provided with one cross-sectional transition 39 respectively in order to change the square flow cross-section to a circular one.

Figure 7:
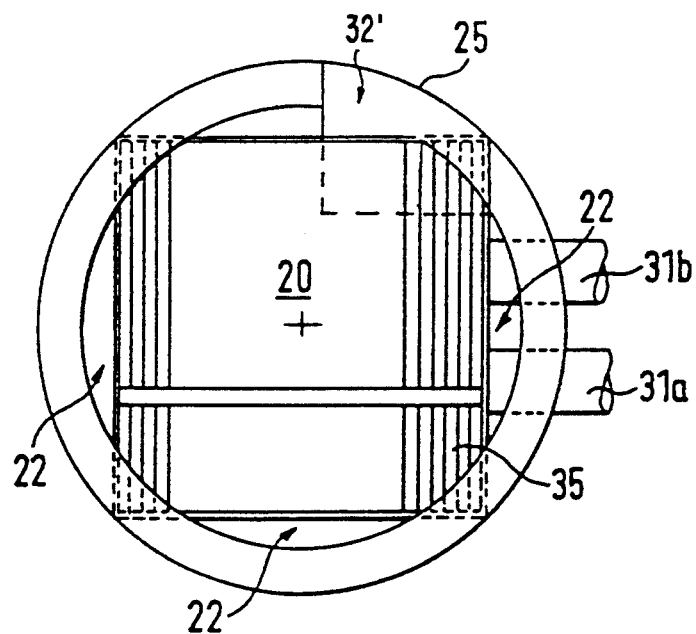
FIG. 7 is a cross-sectional view of the heat exchanger with a view onto the matrix.

In a deflecting device 40 in the circular area of the flow duct 38, downstream of the matrix 20, a partial flow L of the cooling air K is deflected into the four return flow ducts 22 (see FIG. 7) formed between the pressure housing 25 and the rectangular flow duct 38, in order to be admixed upstream of the matrix 20 to the uncooled cooling air by way of a ring-shaped gas mixing device 32. Because of the additional gas mixing device 32' which, with respect to the flow direction S, is arranged downstream of the primary gas mixing device 32 in the upper return flow duct 22, air from the partial air flow L is fed to the matrix 20 in a targeted manner in the transition area to the fuel-discharging central pipe 31b. As a result, excess temperatures are avoided in the special section tubes 35.

The deflecting device 40 comprises an air collecting spiral 42 which is concentric with respect to the round area of the flow duct 38 and an air distributor spiral 43 which is connected with the cylinder-segment-shaped return flow ducts 22. The air distributor spiral 43, which is connected with the air collecting spiral 42 by way of a deflecting arc 44, is arranged in the round flow duct 38 between the matrix 20 and the air collecting spiral 42. For the air volume control of the partial air flow L, a gas blower 23 is inserted in the deflecting arc 44.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A cooling arrangement for cooling air of a jet engine having an air inlet, operated with a cryogenically stored fuel, comprising:
    a heat exchanger having a matrix, wherein said fuel, after heat absorption in said heat exchanger, is fed to the engine, said heat exchanger being arranged in-line with a fuel feeding pipe;
    wherein the cooling air is removed from said air inlet through an air feeding pipe and, after undergoing a heat loss in said heat exchanger, is fed to said engine for cooling;
    a controllable recirculating blower; and
    a fuel mixing device, wherein a partial fuel flow of evaporated fuel flowing out of said heat exchanger is delivered by said controllable recirculating blower via said fuel mixing device to avoid icing of the heat exchanger and is fed to the fuel feeding pipe before flowing through the matrix of said heat exchanger wherein a partial cooling air flow of the cooling air is branched off downstream of the matrix and is fed to the cooling air upstream of the matrix by way of a return flow duct.

2. A cooling arrangement according to claim 1, wherein the partial cooling air flow is delivered by means of a controllable gas blower arranged in the return flow duct.

3. A cooling arrangement according to claim 1, wherein at least a fraction of the partial cooling air flow is fed to the cooling air in a concentrated manner in the area of the fuel outlet of the matrix.

4. A cooling arrangement according to claim 1, wherein a cooling air compressor is arranged in the cooling air pipe between the heat exchanger and the engine.

5. A cooling arrangement according to claim 1, wherein the jet engine is a hypersonic jet engine.

6. A cooling arrangement for cooling air of a jet engine having an air inlet, operated with a cryogenically stored fuel, comprising:
  a heat exchanger having a matrix, wherein said fuel, after heat absorption in said heat exchanger, is fed to the engine, said heat exchanger being arranged in-line with a fuel feeding pipe;
  wherein the cooling air is removed from said air inlet through an air feeding pipe and, after undergoing a heat loss in said heat exchanger, is fed to said engine for cooling;
  a fuel mixing device, wherein a partial fuel flow flowing out of said heat exchanger is fed to the fuel feeding pipe before flowing through the matrix of said heat exchanger by way of a fuel recirculating pipe via said fuel mixing device; and
  wherein a partial flow of the cooling air is branched off downstream of the matrix and is fed to the cooling air upstream of the matrix by way of a return flow duct.

* * * * *